April 17, 1956     H. GUNTHER     2,741,944

ILLUMINATING SYSTEM FOR COPYING COLORED PICTURES

Filed Aug. 4, 1951     2 Sheets-Sheet 1

INVENTOR:
HANS GUNTHER
BY
Connolly and Hutz
HIS ATTORNEYS

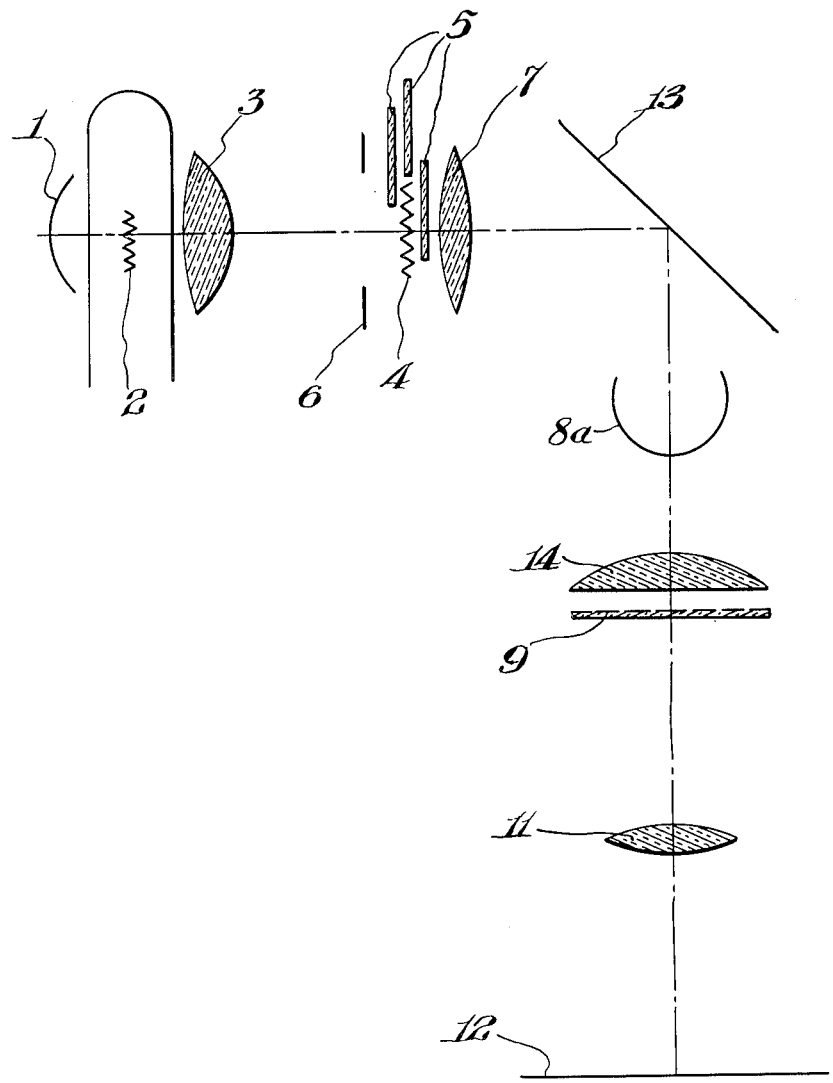

United States Patent Office 2,741,944
Patented Apr. 17, 1956

2,741,944

ILLUMINATING SYSTEM FOR COPYING COLORED PICTURES

Hans Gunther, Munich, Germany, assignor to Agfa Camera-Werk Aktiengesellschaft, Munich, Germany, a corporation of Germany Application August 4, 1951, Serial No. 240,326

Claims priority, application Germany August 12, 1950

6 Claims. (Cl. 88—24)

My present invention relates to an illuminating system for copying colored pictures. More particularly, it concerns such a system for use in copying or enlarging apparatus, whereby a very uniform, readily adjustable tinting of the light can be attained.

In order to eliminate undesired color tones that occur in the copying of colored photographs, it is customary to tint the copying light. Illuminating systems are known wherein the copying lamp is reproduced upon an opalescent plate by means of a condenser, and corrective color filters of maximum density are wholly or partly introduced into the path of the copying light immediately adjacent to the aperture diaphragm of this condenser, whereby the reproduction of the lamp on the opalescent plate is tinted uniformly and to a degree that can be regulated by the extent to which the filters are introduced. The opalescent plate with the tinted reproduction of the lamp then serves as the immediate light source for illumination of a copying surface. In this kind of copying arrangement, depending upon the construction of the optical system, a non-uniform distribution of light resulting from the structure of the lamp may become strongly noticeable.

The object of my invention is to attain a structureless distribution of light in such an illuminating system. I achieve this object by locating the corrective color filters in the reproduction plane of the light source or a plane adjacent thereto and by reproducing the entrance opening of the condenser or a plane adjacent thereto upon the opalescent plate that lies in light path of the system. For reproduction of the entrance opening of the condenser or of an adjacent plane upon the opalescent plate, there serves a collector lens arranged in the path of light. In order to limit the area wherein the color filters are effective, a diaphragm is provided in the reproduction plane of the light source or in an adjacent plane. When using a clear lamp with heated coils, the filters are so arranged that they can be introduced in the direction of the reproduction of the illuminating coil axis.

Figure 1:
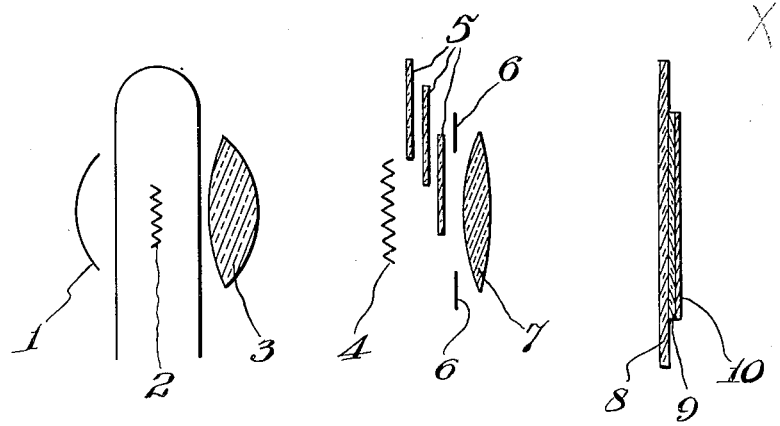
Figure 2:
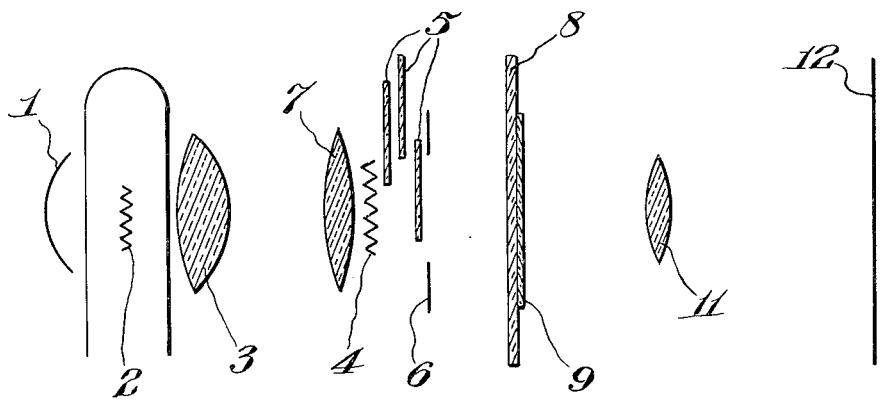

In the accompanying drawings there are illustrated by way of example several applications of the illuminating system according to my invention. In these drawings:

Fig. 1 is a diagrammatic cross section of the system applied to a copying apparatus, Fig. 2 is such a section applied to an enlarging apparatus, and Fig. 3 is such a representation of the system employed as a supplement for a normal enlarging apparatus.

Referring particularly to Fig. 1, the light source 2, strengthened by a collecting mirror 1, for example, the coil of a projection lamp for amateur motion picture film, is reproduced by means of the condenser 3 in the plane 4. Adjacent to this reproduction the color filters 5 are more or less introduced into the light path. The effective area for the color filters 5 is limited by a diaphragm 6, in this case of rectangular shape. By means of the collector lens 7 that may also lie between the condenser 3 and the coil reproduction 4, the entrance opening of the condenser 3 is reproduced upon the opalescent plate 8 against which in this embodiment the negative 9 with the copying paper 10 are placed. By a suitable choice of the breaking surfaces of the condenser 3 one may achieve with this arrangement not only a uniform tinting, but also a uniform illumination of even a large copying surface with minimum loss of light. With such an arrangement one may also adjust the size of the illuminating spot to conform with the size of the negative to be copied, thereby attaining optimum utilization of the light, by changing the enlarging conditions of the condenser with respect to its reproduction upon the opalescent plate.

When utilizing the illuminating system in an enlarging apparatus, as indicated in Fig. 2, one may, as in the case of the above-described copying apparatus, apply the negative 9 upon or shortly behind the opalescent plate 8. By means of the lens 11 the negative 9 is reproduced as usual in the copying plane 12. In order to achieve the most uniform illumination of the copying plane 12, the light distribution upon the opalescent plate 8 may be so chosen by corresponding optical dimensioning of the condenser 3, that the light is more highly concentrated at the edge, i. e. so that the center of the illuminating spot remains somewhat darker. Thereby the loss of brightness towards the edge, occasioned by the lens 11, can be compensated. Also in this case the size of the illuminating spot can be made to conform to the size of the negative to be copied.

The illuminating system according to the invention may likewise be employed as a supplement to a normal enlarging apparatus by replacing, as shown in Fig. 3, the customary opalescent lamp arranged above a condenser 14 by an opalescent plate 8 with an illuminating spot produced by means of the illuminating system. In this case it may be advantageous to employ, instead of a flat opalescent plate 8, an opalescent sphere 8a or a "calotte." The reference numeral 13 represents a turning mirror arranged in the path of light.

I claim:

1. An illuminating system comprising a light source, an opalescent plate, a condenser disposed between said light source and said opalescent plate to reproduce an image of said light source in a plane disposed between said condenser and said opalescent plate, a light converging means disposed between said condenser and said opalescent plate so that it reproduces an image of the aperture of said condenser upon said opalescent plate, and a corrective color filter disposed for insertion into said light path substantially within said plane wherein said image of said light source is reproduced.

2. An illuminating system as set forth in claim 1 wherein said corrective color filter is selectively insertable to a variable extent within said light path to produce a uniform color density over said surface being illuminated, and said color density varying in accordance with the extent of insertion of said filter within said light path.

3. An illuminating system as set forth in claim 2 wherein said filter is comprised of a plurality of filters which are individually selectively insertable to variable extents within said light path.

4. An illuminating system as set forth in claim 1 wherein said light converging means is comprised of a collector lens.

5. An illuminating system as set forth in claim 1 wherein a diaphragm stop is disposed in said path of light adjacent said filter to limit the effective area of said filter.

6. An enlarging system for illuminating a negative disposed in the path of light rays passing through said filter comprising the combination set forth in claim 1 in combination with a negative disposed behind said opalescent plate, an enlarging lens disposed in the path of light rays passing through said negative, and said condenser being characterized by a structure which causes the edges of its concentrated light path to be brighter than the center of its concentrated light path to compensate for the loss of brightness towards the edge caused by said enlarging lens.

References Cited in the file of this patent

UNITED STATES PATENTS

| | | |
|---|---|---|
| 2,009,145 | Nathan | July 23, 1935 |
| 2,117,727 | Jones | May 17, 1938 |
| 2,212,975 | Boynton | Aug. 27, 1940 |
| 2,300,970 | Riess | Nov. 3, 1942 |